Patented July 19, 1932

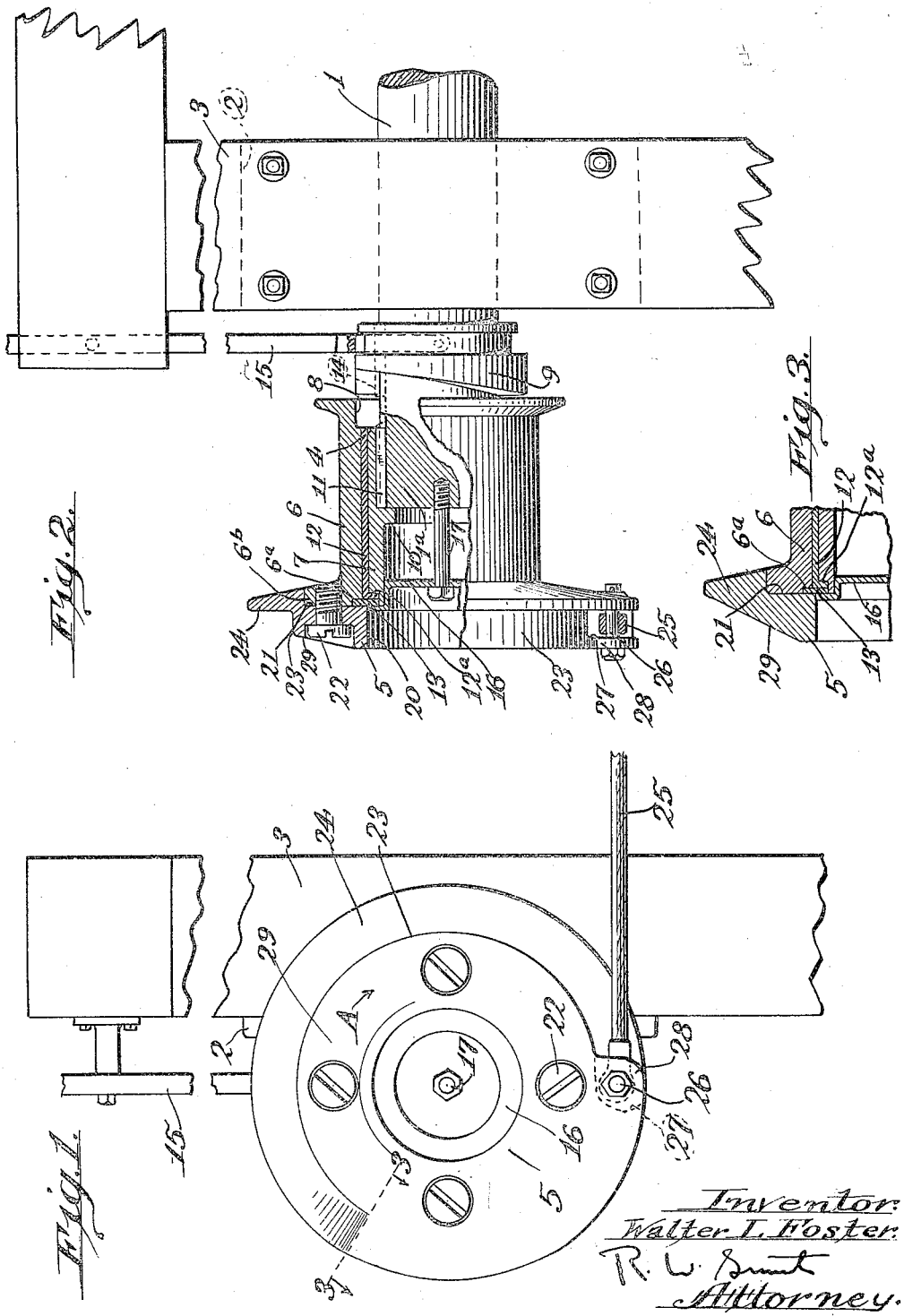
July 19, 1932. W. L. FOSTER 1,867,621
COMBINATION JOINT BREAKER AND CATHEAD
Filed Jan. 20, 1930
Inventor:
Walter L. Foster
Attorney.

1,867,621

UNITED STATES PATENT OFFICE

WALTER L. FOSTER, OF WHITTIER, CALIFORNIA, ASSIGNOR TO JOHN W. MacCLATCHIE, DOING BUSINESS AS MacCLATCHIE MANUFACTURING COMPANY, OF COMPTON, CALIFORNIA

COMBINATION JOINT BREAKER AND CATHEAD

Application filed January 20, 1930. Serial No. 421,987.

This invention is an attachment for the rotary draw works of a well drilling rig, and has for its object the provision of extremely simple but practical means for actuating the tongs which are employed at the joints between lengths of drill pipe, casing and the like.

More particularly it is an object of the invention to preferably detachably combine the tong actuating means with a usual cat head structure, and to adapt the combined device for replacement of the usual cat heads at the respective ends of the countershaft of a rotary draw works, so that the combined device may be mounted at that end of the countershaft where it will be operative for respectitvely breaking joints and making-up casing.

It is a further object of the invention to either drive the tong actuating means by the countershaft of the draw works or render said tong actuating means inoperative, and to provide for mounting the combined cat head and tong actuating means on the restricted length of the countershaft projecting beyond the frame of the draw works for reception of a usual cat head, so as to insure the necessary space for shifting the driving connection to operative or inoperative position.

Further objects of the invention will be readily understood from the following description of the accompanying drawing in which:

Fig. 1 is an end view of the invention.

Fig. 2 is a side elevation, partly in axial section.

Fig. 3 is a detail section on the line 3—3 of Fig. 1.

The invention is employed in connection with a usual rotary draw works having a countershaft 1 journaled in suitable bearings which are mounted on the uprights of the draw works frame, the respective ends of the countershaft and its mountings being of similar construction and comprising a bearing 2 on upright 3, with end $1^a$ of the countershaft which projects outwardly beyond the proximate upright being of usual construction, i. e. of a restricted length whereby it will just accommodate a usual cat head and having a keyway 4 extending its length for fixing the cat head thereon.

The attachment which forms the subject matter of the present invention is adapted to replace the usual cat head at either or both ends of the countershaft, and comprises a tong actuating means in the form of an interruption sheave 5 which is preferably mounted on the end of a usual cat head 6 having flanged ends $6^b$, with the combined cat head and interrupted sheave supported on shaft end $1^a$ and so spaced from the proximate upright 3 as to provide for a clutch engagement between the shaft end and the attachment whereby the latter may be rotated with the countershaft or may remain idle thereon.

In order to provide the necessary space for the clutch and at the same time support cat head 6 throughout its length, a sleeve 7 is preferably mounted on the restricted length of shaft end $1^a$ so as to project therebeyond, and the cat head 6 with sheave 5 fixed thereto is journaled on this sleeve, with the inner end of the cat head forming one element 8 of a usual clutch, adapted for engagement or disengagement by a cooperating clutch element 9 which is slidable on shaft end $1^a$ in the space between cat head 6 and the proximate upright 3.

The sleeve 7 is preferably internally flanged medially of its length as shown at 10, with the flange adapted for axial abutment against shaft end $1^a$; and the sleeve is preferably fixed against rotation relative to the shaft end by a key 11 engaging the usual keyway 4. The cat head 6 is journaled on sleeve 7, preferably with an interposed radial bearing sleeve 12 and an end thrust bearing annulus 13; and the clutch element 9 may be adapted to slide upon shaft end $1^a$ while fixed against rotation relative thereto, by means of a key 14 engaging the keyway 4, so that when the clutch element 9 is axially shifted, as for example by a usual operating yoke 15, the cat head 6 is either rotated with shaft 1 or is idle thereon.

The bearing elements 12—13 may be held in place by a detachable cap 16, and for this purpose the outer end of sleeve 7 may be annularly recessed at its outer periphery with a flanged end 12ª of the bearing sleeve 12 seating in said recess, and the bearing annulus 13 overlying the flange 12ª at its inner periphery and having its outer periphery seating in a cooperating recess 6ª in the end of cat head 6; and the cap 16 overlies the inner peripheral portion of annulus 13 and may be detachably held against axial displacement by a bolt 17 extending through the center of the cap and threaded into the shaft end 1ª.

The sheave 5 is preferably detachably fixed to the end of cat head 6, and for this purpose may have a bore 20 adapted for sliding reception over the cap 16 with the inner face of the sheave counterbored at 21 for reception over the flanged end 6ᵇ of the cat head so that the sheave may be bolted to the flange of the cat head as shown at 22. The sheave, when rotated with cat head 6 as a result of engagement of clutch 8—9, is adapted to wind-up a flexible connecting medium and then automatically release the coiled portion thereof so that with usual operating tongs (not shown) connected to the flexible medium, winding it on the sheave will actuate the tongs, and subsequent release of its coiled portion will permit retraction of the tongs for repeating the operation as the rotation of the sheave is continued.

As an instance of this arrangement the sheave may be provided with an arcuate shoulder 23 extending part way around its circumference with a flange 24 projecting radially beyond the shoulder at the inner face of the sheave, and at one end of the shoulder the flexible medium which is adapted for connection to operating tongs is fixed to the sheave so as to coil around the shoulder 23 when the sheave is rotated with shaft 1 in the direction indicated by arrow A in Fig. 1. The flexible medium is preferably a usual cable 25 fastened by means of bolt 26 in recess 27 which may be formed at one end of shoulder 23 by projecting the outer face of the sheave in the form of an overlying ear 28; and toward its opposite end the shoulder 23 gradually decreases in width as a result of tapering the outer face of the sheave as shown at 29 and building up the proximate face of flange 24 until the shoulder finally disappears as a result of the built-up face of the flange merging into a continuation of tapered surface 29 as shown in Fig. 3. The cable 25 is thus adapted to coil around the circumferential length of shoulder 23 and is then released at the point where the shoulder merges into tapered surface 29, so that the tension of the coiled cable is relieved and it returns to its initial slack position adapted for retensioning at each succeeding rotation of the sheave.

I have thus provided an attachment for a rotary draw works adapted to intermittently tension a tong operating cable by extremely simple but practical means, the attachment preferably including a usual cat head and being adapted for convenient mounting on either end of the usual countershaft of the draw works, and arranged so that it may be operatively rotated or may remain idle.

I claim:

1. A rotatable member adapted for winding of a flexible medium thereon and having means operating irrespective of continued rotation of the rotatable member for automatically releasing the coiled portion of the flexible medium before one complete revolution of the rotatable member.

2. A rotatable member having an arcuate shoulder adapted for winding of a flexible medium thereon and merging into the end face of the rotatable member for automatically releasing the coiled portion of the flexible medium after predetermined revolution of the rotatable member.

3. A rotatable member having an arcuate shoulder adapted for winding of a flexible medium thereon, the shoulder terminating short of a complete circumference and merging into the end face of the rotatable member for automatically releasing the coiled portion of the flexible medium before one complete revolution of the rotatable member.

4. In combination, a cat head for a rotary draw works, and an arcuate shoulder at the end of the cat head adapted for winding of a flexible medium thereon and having means for automatically releasing the coiled portion of the flexible medium after predetermined revolution of the cat head.

5. In combination, a cat head for a rotary draw works, and a rotatable member at the end of the cat head having an arcuate shoulder adapted for winding of a flexible medium thereon, the shoulder terminating short of a complete circumference and merging into the end face of the rotatable member for automatically releasing the coiled portion of the flexible medium before one complete revolution of the rotatable member.

6. In combination, a rotatable shaft, a rotatable member journaled thereon, and a clutch adapted to engage said shaft and member, said member having an arcuate shoulder adapted for winding of a flexible medium thereon and merging into the end face of the rotatable member for automatically releasing the coiled portion of the flexible medium after predetermined revolution of the rotatable member.

7. In combination, a rotary draw works having a countershaft, a cat head journaled thereon, a clutch adapted to engage the cat head and the countershaft, and an arcuate shoulder at the end of the cat head adapted for winding of a flexible medium thereon and having means for automatically releasing the coiled portion of the flexible medium after predetermined revolution of the cat head.

8. In combination, a rotary draw works including a frame and a countershaft having an end of restricted length projecting beyond the frame; an extension sleeve adapted for mounting on the projecting end of the countershaft, and a rotatable member mounted on the extension sleeve and adapted for winding of a flexible medium thereon and having means for automatically releasing the coiled portion of the flexible medium after predetermined revolution of the rotatable member.

9. In combination, a rotary draw works including a frame and a countershaft having an end of restricted length projecting beyond the frame; an extension sleeve adapted for mounting on the projecting end of the countershaft, a rotatable member journaled on the extension sleeve and adapted for winding of a flexible medium thereon and having means for automatically releasing the coiled portion of the flexible medium after predetermined revolution of the rotatable member, and a clutch adapted to engage the projecting end of the countershaft and the rotatable member.

10. In combination, a rotary draw works including a frame and a countershaft having an end of restricted length projecting beyond the frame; an extension sleeve adapted for mounting on the projecting end of the countershaft, a cat head mounted on the extension sleeve, and an arcuate shoulder at the end of the cat head adapted for winding of a flexible medium thereon and having means for automatically releasing the coiled portion of the flexible medium after predetermined revolution of the cat head.

11. In combination, a rotary draw works including a frame and a countershaft having an end of restricted length projecting beyond the frame; an extension sleeve adapted for mounting on the projecting end of the countershaft, a cat head journaled on the extension sleeve, a clutch adapted to engage the projecting end of the countershaft and the cat head, and an arcuate shoulder at the end of the cat head adapted for winding of a flexible medium thereon and having means for automatically releasing the coiled portion of the flexible medium after predetermined revolution of the cat head.

12. In combination, a rotary draw works including a frame and a countershaft having an end of restricted length projecting beyond the frame; an extension sleeve adapted for mounting on the projecting end of the countershaft, a rotatable member journaled on the extension sleeve and adapted for winding of a flexible medium thereon and having means for automatically releasing the coiled portion of the flexible medium after predetermined revolution of the rotatable member, a bearing annulus between the rotatable member and the extension sleeve, a cap overlying the end of the bearing annulus and fixed relative to the extension sleeve for preventing axial displacement of the bearing annulus, and a clutch adapted to engage the projecting end of the countershaft and the rotatable member.

13. In combination, a rotary draw works including a frame and a countershaft having an end of restricted length projecting beyond the frame; an extension sleeve adapted for mounting on the projecting end of the countershaft, a cap overlying the end of the extension sleeve and fixed relative to the countershaft for preventing axial displacement of the sleeve, a rotatable member journaled on the extension sleeve and adapted for winding of a flexible medium thereon and having means for automatically releasing the coiled portion of the flexible medium after predetermined revolution of the rotatable member, and a clutch adapted to engage the projecting end of the countershaft and the rotatable member.

14. A rotatable member adapted for winding of a flexible medium thereon and having means operating irrespective of continued rotation of the rotatable member for automatically releasing the coiled portion of the flexible medium after predetermined revolution of the rotatable member.

15. A rotatable member adapted for winding of a flexible medium thereon and having a peripheral surface so tapering as to recede from beneath the coiled portion of the flexible medium after predetermined revolution of the rotatable member so as to throw-off the coiled portion of the flexible medium irrespective of continued rotation of the rotatable member.

16. A rotatable member adapted for winding of a flexible medium thereon and having a peripheral surface so tapering as to recede from beneath the coiled portion of the flexible medium after predetermined revolution of the rotatable member so as to disengage said coiled portion of the flexible medium by throwing it off the end of the rotatable member.

17. In combination, a cat head for a rotary draw works, and a member rotatable therewith adapted for winding of a flexible medium thereon and having means operating irrespective of continued rotation of the rotatable member for automatically releasing the coiled portion of the flexible medium after predetermined revolution of the rotatable member.

18. In combination, a cat head for rotary draw works, and a member rotatable therewith adapted for winding of a flexible medium thereon and having a peripheral surface so tapering as to recede from beneath the coiled portion of the flexible medium after predetermined revolution of the rotatable so as to disengage said coiled portion of the flexible medium by throwing it off the end of the rotatable member.

19. In combination, a cat head for a rotary draw works, and a rotatable member at the end of the cat head having an arcuate shoulder adapted for winding of a flexible medium thereon, the shoulder merging into the end face of the rotatable member for automatically releasing the coiled portion of the flexible medium after predetermined revolution of the rotatable member.

20. In combination, a rotatable shaft, a rotatable member, a clutch adapted to engage said member and shaft, the rotatable member being adapted for winding of a flexible medium thereon and having means operating irrespective of continued rotation of the rotatable member for automatically releasing the coiled portion of the flexible medium after predetermined revolution of the rotatable member.

21. In combination, a rotatable shaft, a rotatable member, a clutch adapted to engage said member and shaft, the rotatable member being adapted for winding of a flexible medium thereon and having a peripheral surface so tapering as to recede from beneath the coiled portion of the flexible medium after predetermined revolution of the rotatable member so as to disengage said coiled portion of the flexible medium by throwing it off the end of the rotatable member.

22. In combination, a rotary draw works having a countershaft, a cat head journaled thereon, a clutch adapted to engage the cat head and the countershaft, and a member rotatable with the cat head and adapted for winding of a flexible medium thereon and having means operating irrespective of continued rotation of the rotatable member for automatically releasing the coiled portion of the flexible medium after predetermined revolution of the rotatable member.

23. In combination, a rotary draw works having a countershaft, a cat head journaled thereon, a clutch adapted to engage the cat head and the countershaft, and a member rotatable with the cat head and adapted for winding of a flexible medium thereon and having a peripheral surface so tapering as to recede from beneath the coiled portion of the flexible medium after predetermined revolution of the rotatable member so as to disengage said coiled portion of the flexible medium by throwing it off the end of the rotatable member.

24. In combination, a rotatable shaft having a projecting end of restricted length, an extension sleeve adapted for mounting on the projecting end of the shaft, and a rotatable member mounted on the extension sleeve and adapted for winding of a flexible medium thereon and having means for automatically releasing the coiled portion of the flexible medium after predetermined revolution of the rotatable member.

25. In combination, a rotatable shaft having a projecting end of restricted length, an extension sleeve adapted for mounting on the projecting end of the shaft, a rotatable member adapted for mounting on the extension sleeve and adapted for winding of a flexible medium thereon and having means for automatically releasing the coiled portion of the flexible medium after predetermined revolution of the rotatable member, and a clutch adapted to engage the projecting end of the shaft and the rotatable member.

26. In combination, a rotatable shaft having a projecting end of restricted length, an extension sleeve adapted for mounting on the projecting end of the shaft, a cat head mounted on the extension sleeve, and a member rotatable with the cat head adapted for winding of a flexible medium thereon and having means for automatically releasing the coiled portion of the flexible medium after predetermined revolution of the rotatable member.

27. In combination, a rotatable shaft having a projecting end of restricted length, an extension sleeve adapted for mounting on the projecting end of the shaft, a cat head journaled on the extension sleeve, a clutch adapted to engage the projecting end of the shaft and the cat head, and a member rotatable with the cat head adapted for winding of a flexible medium thereon and having means for automatically releasing the coiled portion of the flexible medium after predetermined revolution of the rotatable member.

28. In combination, a rotatable shaft having a projecting end of restricted length, an extension sleeve adapted for mounting on the projecting end of the shaft, a rotatable member journaled on the extension sleeve and adapted for winding of a flexible medium thereon and having means for automatically releasing the coiled portion of the flexible medium after predetermined revolution of the rotatable member, a bearing annulus between the rotatable member and the extension sleeve, and means for maintaining the parts in assembled relation comprising a retaining cap overlying the end of the bearing annulus.

29. In combination, a rotatable shaft having a projecting end of restricted length, an extension sleeve adapted for mounting on the projecting end of the shaft, a cap overlying the end of the extension sleeve and fixed relative to the shaft for preventing longitudinal displacement of the sleeve, and a rotatable member journaled on the extension sleeve and adapted for winding of a flexible medium thereon and having means for automatically releasing the coiled portion of the flexible medium after predetermined revolution of the rotatable member.

30. In combination, a rotatable element shaft, a rotatable member journaled on said element and adapted for winding of a flexible medium thereon and having means for automatically releasing the coiled portion of the flexible medium after predetermined revolution of the rotatable member, a bearing annulus between the rotatable member and said rotatable element, and means for maintaining the parts in assembled relation comprising a retaining cap overlying the end of the bearing annulus.

31. In combination, a rotatable element, a rotatable member journaled on said element and adapted for winding of a flexible medium thereon and having means for automatically releasing the coiled portion of the flexible medium, after predetermined revolution of the rotatable member, a bearing annulus between the rotatable member and said rotatable element, said bearing annulus engaging the rotatable member so as to prevent its longitudinal displacement, and a cap overlying the end of the bearing annulus and fixed relative to the rotatable element.

In testimony whereof I have affixed my signature.

WALTER L. FOSTER.